(12) United States Patent
Payne, IV

(10) Patent No.: US 7,659,708 B2
(45) Date of Patent: Feb. 9, 2010

(54) BROADCAST RECEIVER HAVING INTEGRATED SPECTRUM ANALYSIS

(75) Inventor: John B. Payne, IV, Newton, NJ (US)

(73) Assignee: Nucomm, Inc., Hackettstown, NJ (US)

( * ) Notice: Subject to any disclaimer, the term of this patent is extended or adjusted under 35 U.S.C. 154(b) by 24 days.

(21) Appl. No.: 11/508,632

(22) Filed: Aug. 23, 2006

(65) Prior Publication Data

US 2007/0052406 A1 Mar. 8, 2007

Related U.S. Application Data

(60) Provisional application No. 60/710,833, filed on Aug. 24, 2005.

(51) Int. Cl.
*G01R 23/14* (2006.01)
*G01R 23/00* (2006.01)

(52) U.S. Cl. .................... 324/76.23; 324/76.19

(58) Field of Classification Search .............. 324/76.23, 324/76.19
See application file for complete search history.

(56) References Cited

U.S. PATENT DOCUMENTS

| 5,081,703 | A | * | 1/1992 | Lee | 455/13.1 |
| 5,442,472 | A | * | 8/1995 | Skrobko | 398/9 |
| 6,201,955 | B1 | * | 3/2001 | Jasper et al. | 455/277.2 |
| 7,116,092 | B2 | * | 10/2006 | Jenkins et al. | 324/76.19 |
| 2004/0110520 | A1 | * | 6/2004 | Barbara et al. | 455/506 |
| 2007/0026830 | A1 | * | 2/2007 | Guilford | 455/260 |
| 2007/0173217 | A1 | * | 7/2007 | Arai | 455/214 |

* cited by examiner

*Primary Examiner*—Timothy J Dole
*Assistant Examiner*—John Zhu
(74) *Attorney, Agent, or Firm*—Lerner, David, Littenberg, Krumholz & Mentlik, LLP

(57) ABSTRACT

A receiver for receiving a broadcast channel comprising a spectrum analyzer physically integrated into the receiver and operative to receive an intermediate frequency signal and process the spectral contents of the receive signal.

8 Claims, 4 Drawing Sheets

BROADCAST RECEIVER HAVING INTEGRATED SPECTRUM ANALYSIS

CROSS-REFERENCE TO RELATED APPLICATIONS

This application claims the benefit of the filing date of U.S. Provisional Patent Application No. 60/710,833, filed Aug. 24, 2005, the disclosure of which is hereby incorporated herein by reference.

BACKGROUND

The frequency band that the broadcasters use for electronic news gathering (ENG) is transitioning from 17 MHz bandwidth channels to 12 MHz bandwidth channels. To maintain a substantially consistent level of quality, the current analog FM modulation scheme will be changed to a digital modulation scheme. The current workflow for establishing and maintaining a link between antennas typically requires aligning a simplex link using verbal feedback from the receive site back to the transmitter site. The feedback is usually provided by having an operator at a transmit site make a voice connection using 2-way radio or cell phone. The operator then performs initial antenna alignment in the analog FM domain using feedback from another operator at a receive antenna. Once antenna alignment is confirmed in the analog domain, a switch is then made to digital modulation. This process works adequately in a static environment. Once in the digital mode it is typically impossible to detect the presence of an adjacent channel transmitter that may cause interference until the picture starts to breakup or the BER deteriorates. By then, however, it is usually too late. When this occurs the user must switch back to analog mode to diagnose the problem.

In general, there are no tools currently available to adequately assist the operator in diagnosing link reliability issues in the digital mode. A solution that has been proposed and implemented is to add a spectrum analyzer to the 70 MHz intermediate frequency (IF) output of the receiver. This has proven to be a viable solution for isolating or identifying only a few problems related to on channel or co-channel interference. Such problems are incorrect modulation type of the transmitter or co-channel interference.

FIG. 1 is a diagram that illustrates a standard system configuration 100. As shown, a radio frequency (RF) signal 110 is received and amplified with an amplifier (LNA) 116. This signal is then down converted from the received RF frequency to a first IF frequency typically using a mixer 118 and synthesizer 122. The signal is then filtered with a wide band pass filter 126. The frequency of this first conversion is generally in the 800 MHz range. The specific frequency may vary based on the manufacturer's architecture. The signal is then further amplified at amplifier 130 and further down converted to a second IF frequency using mixer 134 and synthesizer 138. This is typically 140 or 70 MHz but not limited to these frequencies. The signal, now at a lower frequency, can be further filtered via filter 142 to remove adjacent channel signals located above and below the desired channel. After the filter 142, which is typically a narrow band-pass filter, the signal is usually further amplified using amplifier 146, i.e., automatic gain control (AGC), and applied to a demodulator 150 to recreate the original signal transmitted. Manufacturers of receivers will often provide an auxiliary IF output 156 for monitoring purposes. In this system architecture, a spectrum analyzer 160 can be connected external to the IF monitor point 156.

The system of FIG. 1 has generally been deployed and used to conduct link reliability analysis. The architecture of FIG. 1 has not, however, proven to be optimal for diagnosing the majority of link conditions that lead to link failure or reduce link reliability. A reason the aforementioned architecture is flawed is that many problems cannot be detected after filtering and after AGC amplification. Specifically, most interfering signals cannot be detected unless the transmitter is placed into standby mode, which results in the inability to see some types of adjacent or co-channel interference. Furthermore, when the transmitter is placed in standby mode, it is also very difficult to diagnose link problems because the AGC circuit in the receiver brings the noise floor or interference up to a level similar to the desired signal thereby disguising the real problem. This can cause operators or maintenance personnel to become confused and further complicate their job.

One place to monitor the link spectrum would be at the RF input. In this way, the full spectrum can be viewed relative the power levels of the channels of interest. But this architecture is relatively expensive as it duplicates the LNA and synthesizer circuitry. This method may also reduce the receiver's sensitivity because power intended for the receiver will be diverted to the spectrum analyzer.

SUMMARY

As is further described in detail below, an aspect of the present invention is a receiver for receiving a broadcast channel comprising a spectrum analyzer integrated into the receiver and operative to receive an intermediate frequency signal and process the spectral contents of the receive signal.

In accordance with this aspect of the present invention, the intermediate frequency signal comprises a portion of a signal that results from a first down conversion of a radio frequency signal inputted into the receiver. Most preferably, the intermediate frequency signal is at a frequency of 800 MHz.

Further in accordance with this aspect of the present invention, the intermediate frequency signal may comprise a portion of a signal that results from a second down conversion of a radio frequency signal inputted into the receiver. Most preferably, this intermediate frequency signal is at a frequency of 70 MHz, but may also be at a frequency of 140 MHz.

In another aspect of the present invention, a broadcast receiver is provided. The receiver preferably comprises a spectrum analyzer that is physically integrated into the receiver and operative to receive an intermediate frequency signal and process the spectral contents of the receive signal.

In another aspect of the present invention, a broadcast receiver is provided. The receiver preferably comprises a spectrum analyzer that is externally integrated with the receiver and operative to receive an intermediate frequency signal and process the spectral contents of the receive signal. The externally integrated spectrum analyzer may desirably process a signal having a frequency of 800, 140 or 70 MHz.

In another aspect, the present invention is a system for performing antenna alignment in a broadcast system. The system preferably comprises a receiver having a spectrum analyzer integrated therein, a remote control unit connected to the receiver and operative to receive spectral data processed by the spectrum analyzer and a controller for processing the spectral data. Most preferably, the controller is connected to the remote control unit, although in some embodiments processing may be done at the remote control unit.

In accordance with this aspect of the present invention, the spectrum analyzer may be physically integrated into the receiver. Further in accordance with this aspect of the present invention, the spectrum analyzer is externally connected to the receiver.

Further in accordance with this aspect of the present invention, the spectrum analyzer is adapted to receive a signal selected from the group consisting of 800 MHz, 140 MHz or 70 MHz.

A further aspect of the present invention is a receiver for processing a broadcast signal. The receiver preferably comprises a first amplifier for amplifying a radio frequency signal; a mixer and synthesizer for down converting the amplified signal to a first intermediate frequency signal; and a spectrum analyzer integrated in the receiver for receiving a portion of the first intermediate frequency signal. In accordance with this aspect of the present invention, the first intermediate frequency signal of the receiver comprises a digital signal centered at a frequency of substantially 800 MHz.

Further in accordance with this aspect of the present invention, the radio frequency signal comprises a signal having a frequency of at least 2.0 GHz. Further still, the radio frequency signal comprises a signal that is less than 2.7 GHz. Yet further still, the synthesizer may desirably comprise a local oscillator having a frequency between 2.810 and 3.510 GHz.

Further in accordance with this aspect of the present invention, the receiver further preferably comprises a data port for communicating data signals associated with the digital signal. In addition, the data port is preferably selected from an interface selected from the group consisting of an RS232 or universal serial bus interface.

In another aspect, the present invention comprises a system for aligning a radio antenna for a radio frequency broadcast signal, comprising: a receiver operable to receive the radio frequency signal and to produce an intermediate frequency signal having a frequency of approximately 800 MHz from the radio frequency signal; a remote control unit having a spectrum analyzer and adapted to receive the 800 MHz signal and data signals associated with the bit error ratio and receive level of the radio frequency signal, the remote control unit being further adapted to display a spectral content of the 800 MHz signal.

In addition, the foregoing aspects of the present invention may be implemented in any wireless system or in a portable receiver. The foregoing aspects of the present invention may also be implemented in a broadcast receiver operable to receive RF signals in the 2 GHz or 7 GHz frequency bands.

DESCRIPTION

Figure 1:
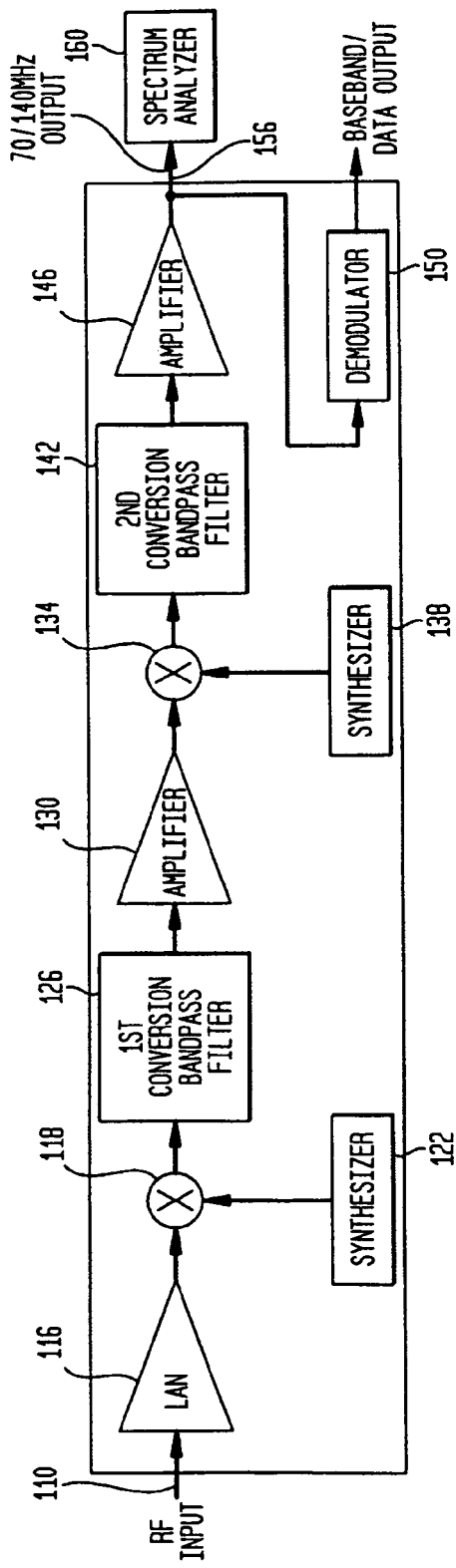
FIG. 1 illustratively depicts a conventional system used for determining link reliability.
Figure 2:
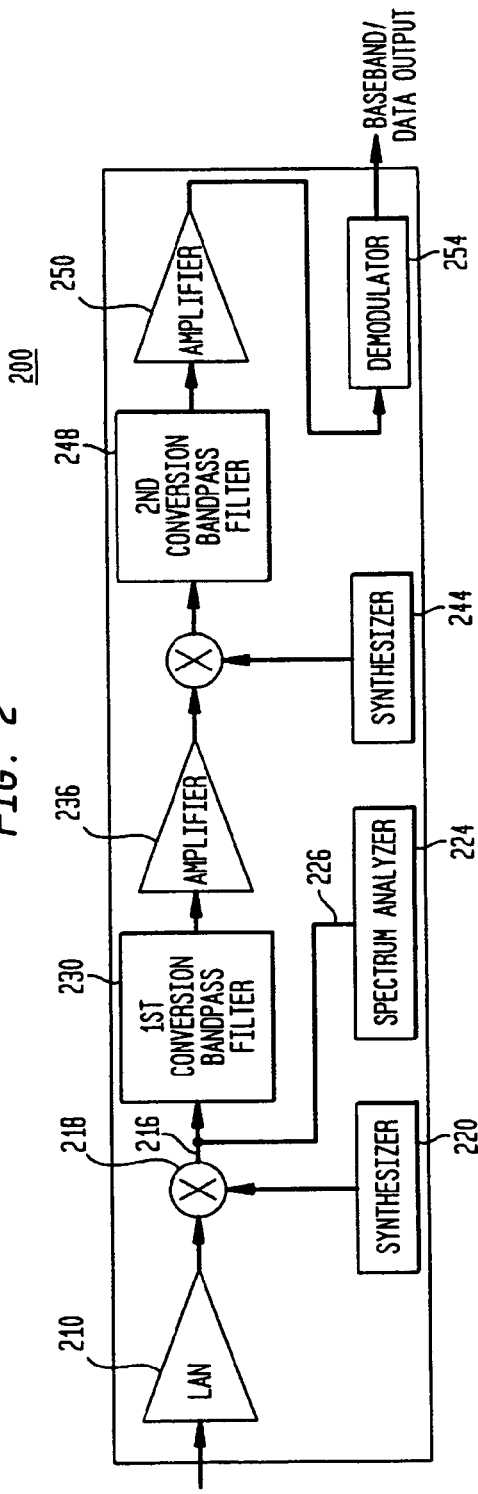
FIG. 2 illustratively depicts a receiver in accordance with an aspect of the present invention.

In accordance with an aspect of the present invention, a spectrum analyzer is integrated into the architecture of broadcast receiver. Such a receiver is adapted to receive ENG broadcast signals. In accordance with this aspect of the present invention, a more cost effective way for performing antenna alignment and perform spectrum analysis of the broadcast channel is provided. This aspect of the present invention advantageously does not require duplication of a receiver's amplifier and synthesizer circuitry. Functionally, this aspect of the present invention generally comprises placing a spectrum analyzer (SA) just after the first conversion circuit but prior to the first band pass filter. Note, however, that the signal may also be detected after the first band pass filter. FIG. 2 shows such a receiver 200 in accordance with an aspect of the present invention. As shown, the receiver 200 includes a first amplifier 210, which amplifies an RF signal received from a transmitter (not shown). The signal from the first amplifier 210 is then mixed down to a first IF signal 216 using a mixer 218 and synthesizer 220. Circuitry 224 for a spectrum analyzer or operable to perform spectrum analysis is integrated into the receiver 200 and a portion 226 of the first IF signal 216 is then fed to the circuitry 224. In the preferred embodiment, the synthesizer 220 is operable as a local oscillator having a frequency range of 2.810 to 3.510 GHz, assuming that the frequency range of the RF input signal is between 2.0 GHz to 2.7 GHz. Thus, when these two signals are mixed, the frequency of the resulting IF signal is the difference–810 MHz.

The circuitry 224 provides the feature that allows for visual indication of the received signals on a selected or desired channel in addition to other signals (i.e., unwanted signals) that may be present on adjacent channels. This allows an operator to view the spectrum of the broadcast signal. The remaining portion of the first IF signal is then coupled to a bandpass filter 230, amplified by amplifier 236 and further mixed down using synthesizer 244 to product a second IF signal. That second IF signal is filtered by filter 248, amplified using amplifier 250 and demodulated using demodulator 254.

The spectrum analyzer 224 may be implemented using a sweeping oscillator or digitally using a fast-Fourier transform (FFT) techniques. In addition, the receiver 200 may be adapted so that an operator may be able to view the spectral output on the receiver or via a display or monitor.

There are a number of benefits to doing the spectrum monitoring on the first IF signal 216. First, the spectrum analyzer utilizes the receivers LNA and synthesizer reducing the required RF hardware. In addition, the affects caused by the amplifier 210 and mixer 218 can be monitored. A problem that occurs in simplex systems is receiver overload. This occurs when a very strong signal, either on channel or on an adjacent channel saturates the amplifier, e.g., LNA 210, causing the desired signal to be destroyed. By monitoring the spectrum just after the LNA 210 and down converting mixer 218 it can be easily determined if the LNA or mixer is being saturated by the desired or undesired signal. Placing the spectrum analyzer at the output of the LNA and mixer also does not affect the receiver sensitivity.

Figure 3:
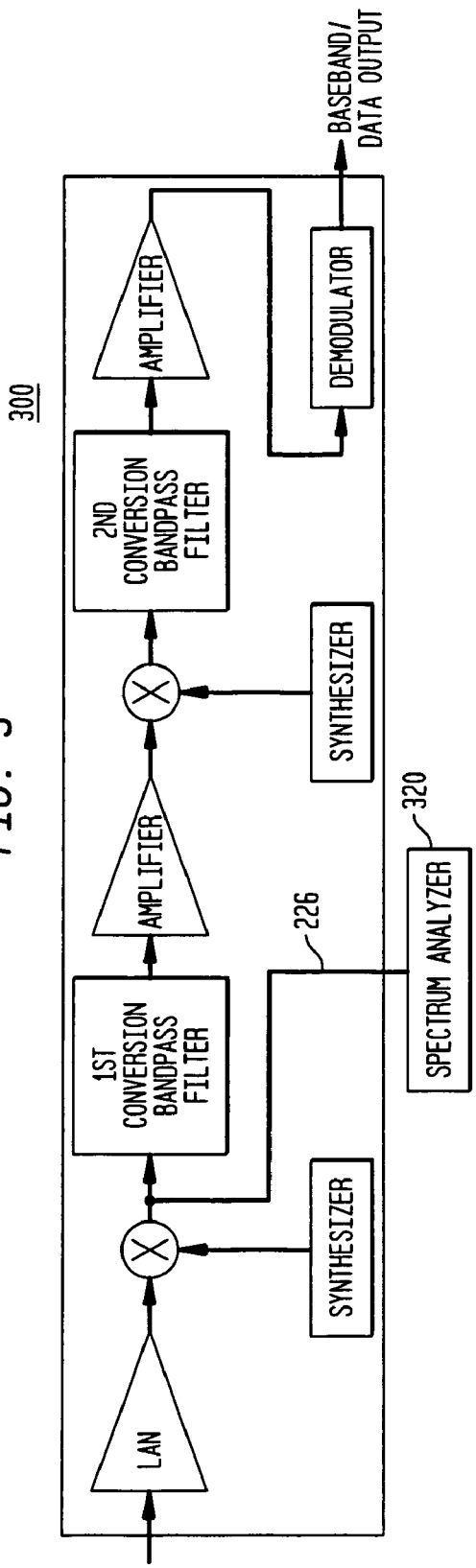
FIG. 3 illustratively depicts a receiver in accordance with an aspect of the present invention.

Other variants of the configuration shown in FIG. 2 may be implemented in accordance with further aspects of the present invention. For example, in FIG. 3, a receiver 300 is shown which is similar to receiver 200 except that the spectrum analyzer functionality 320 is performed outside the receiver. Thus, the receiver 300 provides the proper output required for spectrum analysis. In the regard, a spectrum analyzer may be used by an operator to view spectrum and perform link reliability analysis.

In accordance with an additional aspect of the present invention, since the spectrum analyzer may be implemented as an integral part of the receiver and/or receiver system, spectrum data can be transmitted over a communication channel back to a master control site. Remote control systems have been used in the past to control the receiver and antenna system. In such systems, typically only bit error ratio (BER) and receive levels have been returned to the control center to aid in the alignment of the antennas. In accordance with this aspect of the present invention, an integrated spectrum analyzer at the receiver may send spectrum data back to the control center. This spectral data may be used in conjunction with the BER and receive levels to monitor system perform. For example, that spectrum data then can be used to aid in the alignment of the antenna along with other data that may be available. This also advantageously allows the operator to maintain a reliable link.

The spectrum analyzer output may be used in conjunction with an overlay mask that prescribes the boundaries for the mask. This mask would preferably server as a spectral mask. Using the mask, an operator would be able to tell when antenna alignment is achieved by determining whether the spectrum of the transmitted signal lies within the boundaries of the mask. Alternatively, the output of the spectrum analyzer may be compared to a threshold line indicator. For example, the indicator may demark a region that the spectra should be limited to.

Figure 4:
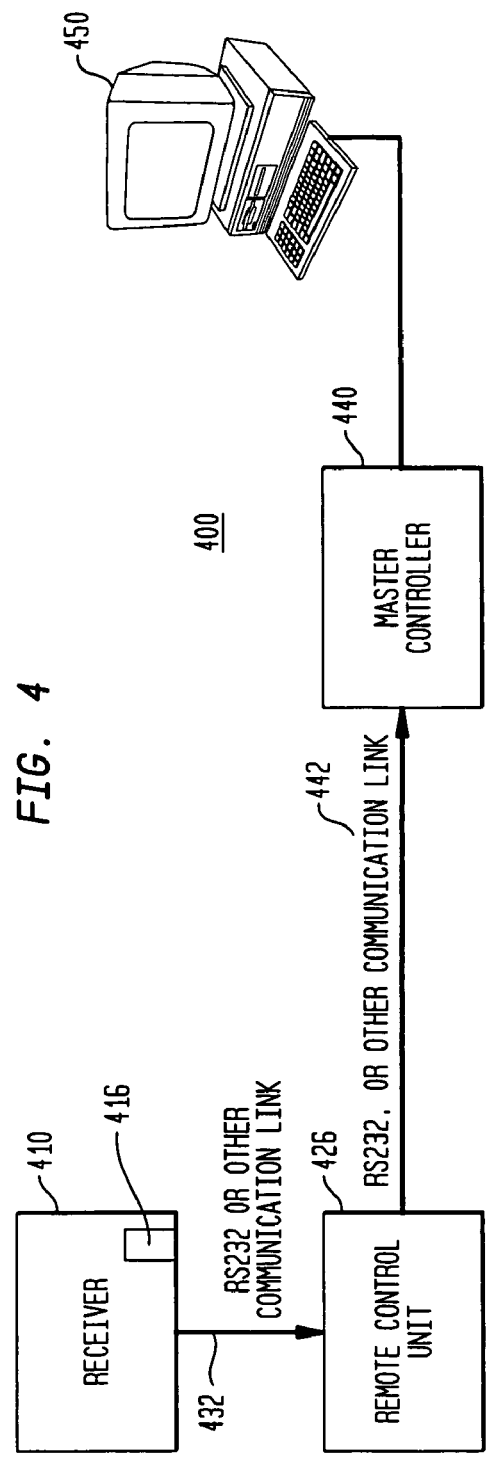
FIG. 4 illustratively depicts a system in accordance with an aspect of the present invention.

FIG. 4 shows a system 400 in accordance with this aspect of the present invention. In particular, the system 400 includes a receiver 410, which includes a spectrum analyzer 416 integrated therein. The receiver 410 communicates with a remote control unit (RCU) 426 over a communication link 432. The communication link 432 may be an RS232 or USB link, but may also use other technologies. The RCU 426 is also connected to a master controller 440 over a data communications link 442. Link 442 may be the same as link 432 or may use one of the other technologies distinct from link 432. A console or monitor 450 is further connected to master controller 440 and used by the operator view data relating to the receiver 410. In accordance with this aspect of the present invention, during antenna alignment spectral data captured by analyzer 416 is transmitted over the links 432 and 442 to master controller 440. The data may be then viewed on console 450 and used by an operator to align the antenna associated with the receiver.

Figure 4A:
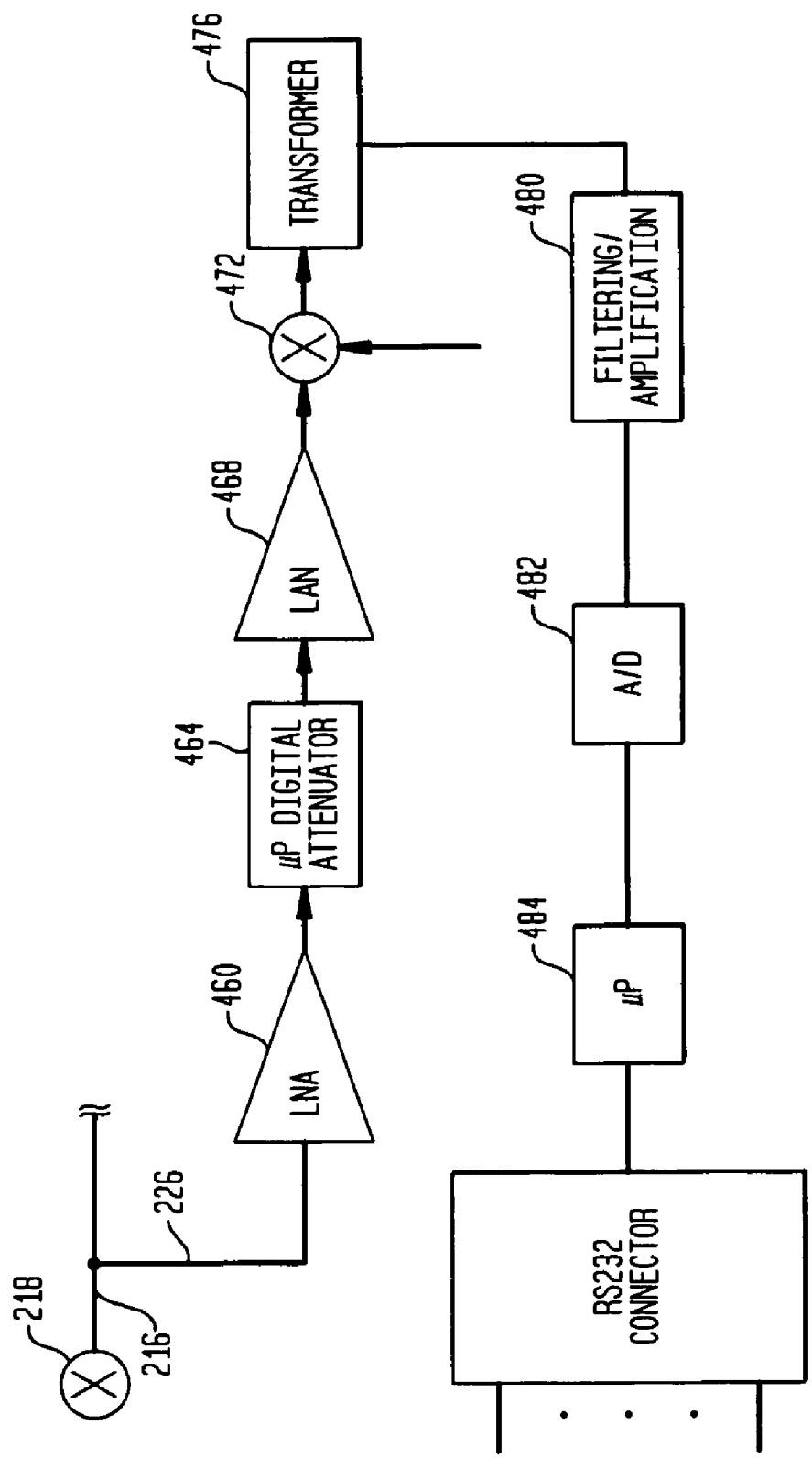
FIG. 4A illustratively depicts a circuit schematic of a receiver in accordance with a further aspect of the present invention.

In the embodiment shown in FIG. 4, further processing of the 800 MHz IF signal may be performed to allow the spectral data associated with that signal to be sent over the link 432. In particular, with reference to FIG. 4A, the 810 MHz signal 226 spilt off from the output of the mixer 218 (see FIG. 2) is preferably fed to an amplifier 460 for level restoration and noise suppression. The output from the amplifier 460 is then fed to a microprocessor controlled attenuator 464 that is used for level control to properly scale the signal. The signal is then amplified by amplifier 468. The signal is then mixed in mixer 472 with local signal having a frequency of approximately 1040 MHz. Therefore, the resultant signal is at a frequency of approximately 230 MHz. The signal is then transformed from an unbalanced to balanced or differential signal in transformer 476. The resulting differential signal is further filtered and amplified at block 480 before converted to a digital signal by analog-to-digital converter 482. That signal is then fed to microprocessor 484. The output from microprocessor 484 is used to drive and control the signals appearing on link 432. With regard to the signal associated with the spectral content of the channel, it contains the frequency and power level of the signal that appears in the 12 MHz bandwidth of the channel of interest. In addition, it also contains the frequency components of the 10 MHz wide channels on either side of the 12 MHz channel. The RS232 signal may then be provided a personal computer so that the spectrum of the channel can be viewed. This additional processing may be integrated into the receiver and viewed via a display connected to the receiver or provided on the receiver itself.

Figure 5:
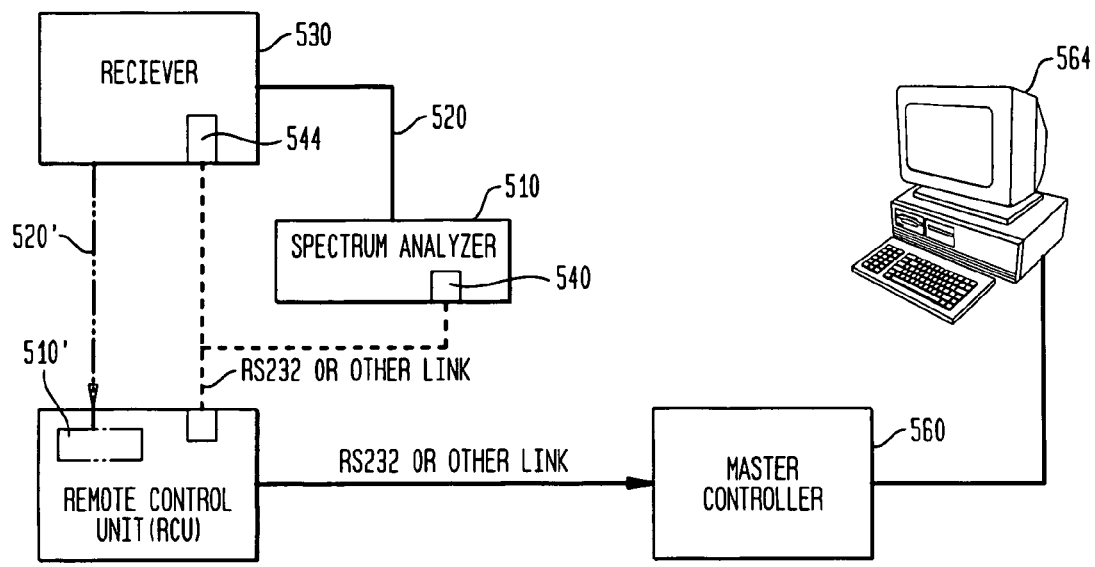
FIG. 5 illustratively depicts a system in accordance with an aspect of the present invention.

FIG. 5 shows a variant of the system 400 in accordance with a further aspect of the present invention. In FIG. 5, the system 500 includes a spectrum analyzer 510 that is physically located outside the receiver and connected to the first IF signal (see FIG. 2). In this system, the receiver 530 desirably includes an output connector that provides the first IF signal 520 centered around approximately 800 MHz. The spectrum analyzer 510 receives the signal 520 and outputs it as data on port 540. Port 540 may comprise an RS232 or USB port. The receiver 530 also includes a similar port 534, which preferably outputs data such as the receive signal level and BER. The data signals from ports 540, 544 are then fed to an RCU. The RCU 550 then forwards this data to a master controller 560. The master controller 560 preferably communicates with the RCU 550 via an RS232 link. That link may however also comprise an USB link. An operator at terminal 564 may then use the data to perform antenna alignment.

In a further variant, the RCU 550 of FIG. 5 may include the spectrum analysis or viewing capability. In particular, a spectrum analyzer 510' may be integrated into the RCU 550. An IF signal 520' centered at approximately 800 MHz may then be fed to the RCU 550. The RCU may then relay the content of the spectral data associated with signal 520' over the data link between it and the master controller 560. The additional data signals from port 544 (e.g., power levels) would still be provided via port 544 on the receiver 530 over an RS232 or USB link to the RCU 550.

Figure 6:
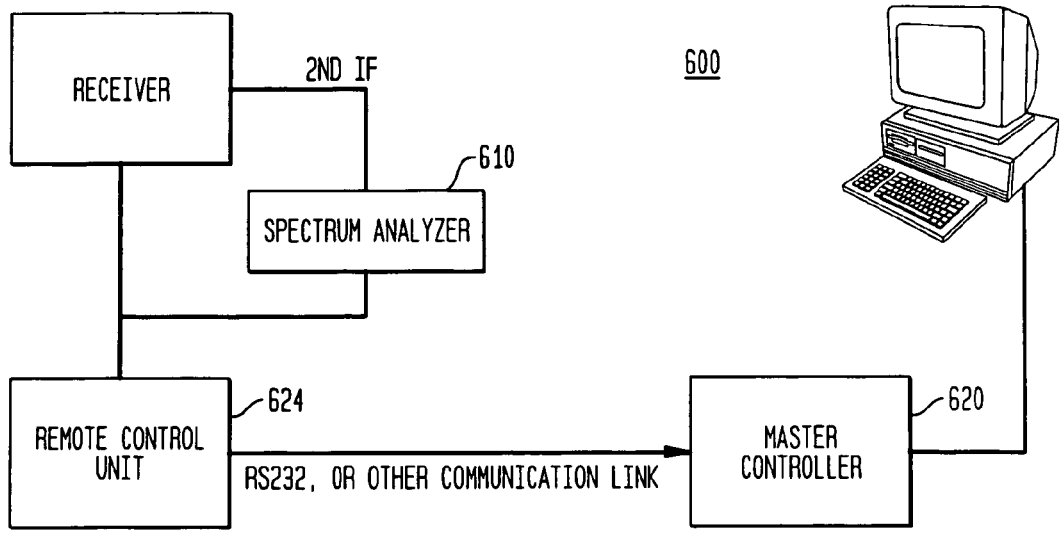
FIG. 6 illustratively depicts a system in accordance with an aspect of the present invention.

FIG. 6 is representative of an additional system 600 where the spectrum analyzer 610 is physically located outside the receiver but connected to the second IF signal (see FIG. 2) at 70 or 140 MHz. Although the system of FIG. 6 provides an output at the second IF signal, that signal is advantageously integrated into the workflow. Specifically, the signal from the spectrum analyzer is forwarded to the master controller 620 by the RCU 624. Therefore, although the operator won't be able to tell as much about he spectral content of neighboring or adjacent signal, spectral analysis is integrated into the system. Thus, spectral analysis is integrated into the workflow.

In particular, the workflow for aligning antennas in the conventional system included first turning off the analog transmitter. Next, operators or maintenance personnel at the local and remote sites (e.g., transmitter and receiver or vice versa) would talk to each other as they align the antenna. This procedure is still used even with the deployment of digital systems. That is, analog is first performed and the digital signal is then switched on. This process is not dynamic and offers no guarantee that digital transmission will perform as expected when the switch is made to digital.

In contrast, the integrated spectrum analysis procedure and system described in accordance with an aspect of the present invention is dynamic. It takes the guessing out the alignment process as it allows the operator to see neighboring or adjacent channels. Thus, it allows the operator to get a sense of whether co-channel interference exist. This system also is more suitable to the ENG environment involving moving trucks or antennas. Using the old workflow, alignment in the analog domain would not account for the scenario where a neighboring digital signal would clip the signal whose antenna is to be aligned. In accordance with the foregoing aspects of the present invention, the unwanted, or interfering channel, is shown adjacent to the center channel or channel of interest. In addition, the process in simplified and less dependent on the skill or experience of the operator to spot unusual artifacts in the spectrum.

For example, as is generally known in the art, in conventional systems the operator had to be trained to spot ghosts or one signal hidden by another. The system and procedures of the present invention advantageously allows an operator to readily identify potential interfering signals by looking at neighboring channels on an spectral trace.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A receiver for processing a broadcast signal, the receiver comprising:
   a first amplifier for amplifying a radio frequency signal;
   a mixer and synthesizer for down converting the amplified signal to a first intermediate frequency signal;
   a spectrum analyzer including a second mixer and a signal source integrated in the receiver for receiving a portion of the first intermediate frequency signal split off from the first intermediate frequency signal; and
   an output means for outputting data relating to and obtained from another portion of the first intermediate frequency signal, and
   wherein the first intermediate frequency signal comprises a digital signal centered at a frequency of substantially 800 MHz.

2. The receiver of claim 1, wherein the radio frequency signal comprises a signal having a frequency of at least 2.0 GHz.

3. The receiver of claim 2, wherein the frequency of the radio frequency signal is less than 2.7 GHz.

4. The receiver of claim 3, wherein the synthesizer comprises a local oscillator having a frequency between 2.810 and 3.510 GHz.

5. The receiver of claim 1 further comprising a data port for communicating data signals associated with the digital signal.

6. The receiver of claim 5, wherein the data port is selected from an interface selected from the group consisting of an RS 232 or universal serial bus interface.

7. The receiver of claim 1 further comprising a first bandpass filter receiving the another portion of the first intermediate frequency signal.

8. The receiver of claim 1 further comprising a demodulator.

* * * * *